Sept. 29, 1931.  A. BARREAUX ET AL  1,825,571
ROTARY INTERNAL COMBUSTION ENGINE
Filed Jan. 23, 1930  4 Sheets-Sheet 1
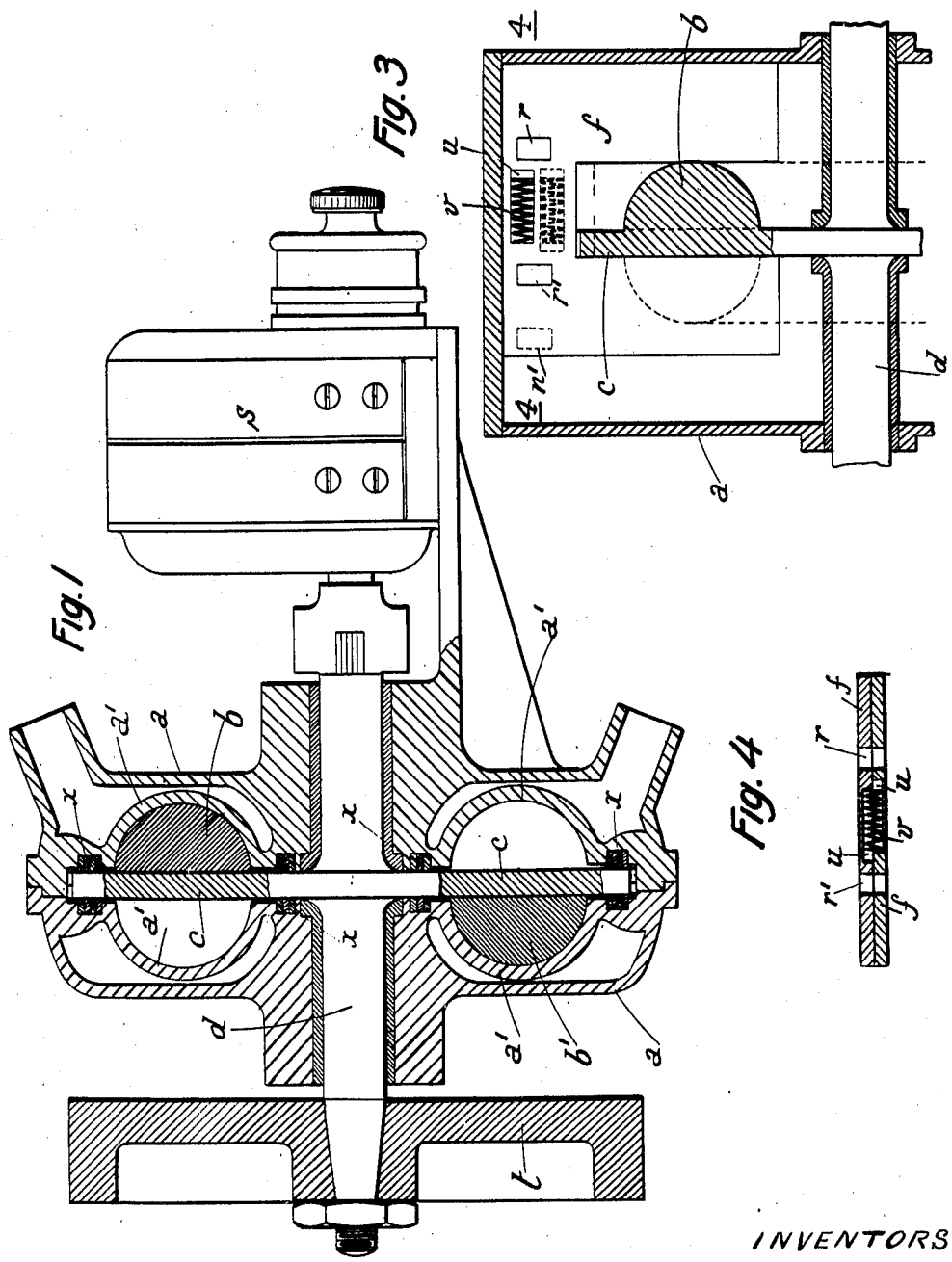
INVENTORS.
Alphonse Barreaux und
Georges Sarrazin
By William C. Luton
Attorney.

Sept. 29, 1931.  A. BARREAUX ET AL  1,825,571
ROTARY INTERNAL COMBUSTION ENGINE
Filed Jan. 23, 1930   4 Sheets-Sheet 2
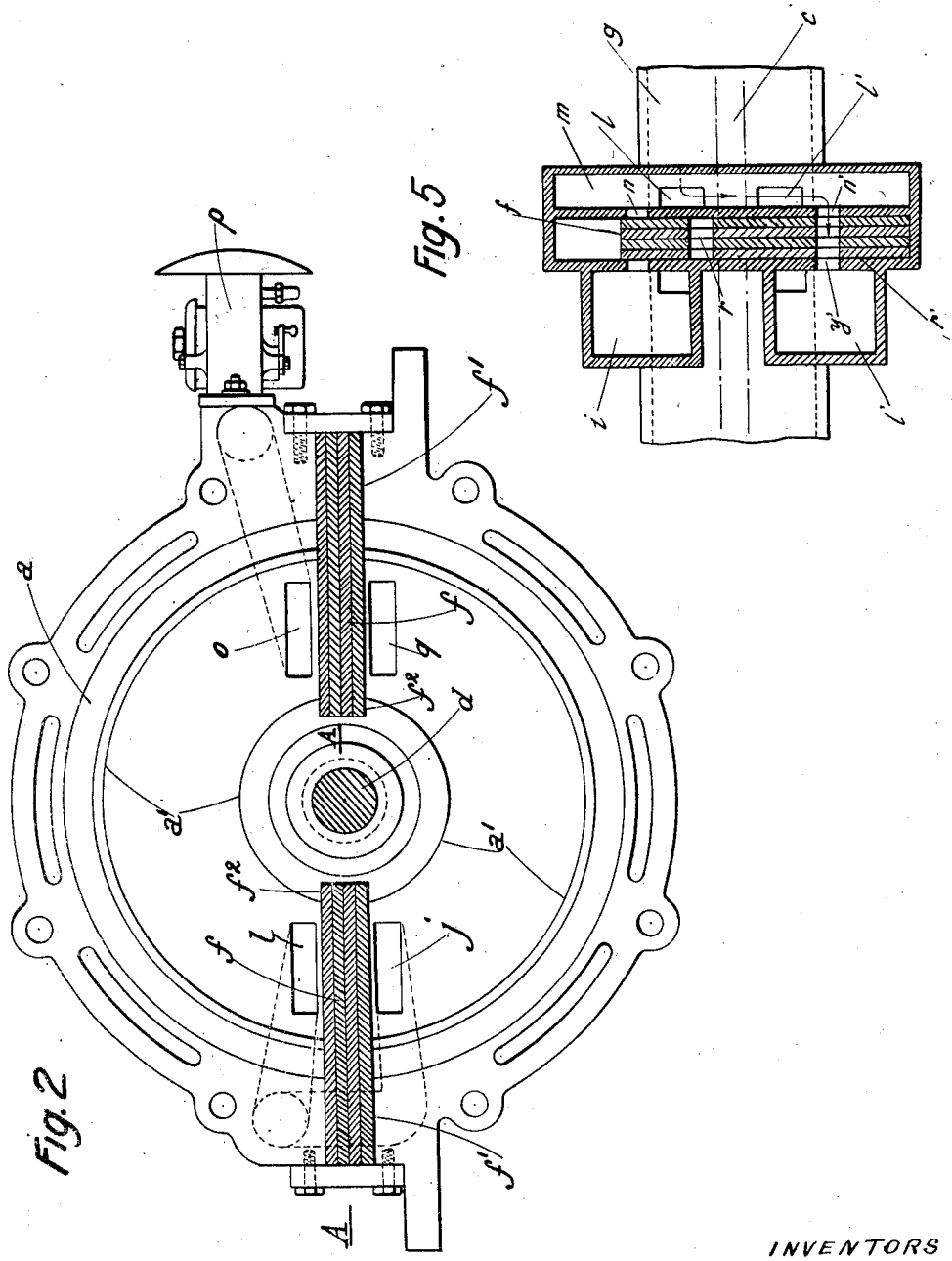
INVENTORS
Alphonse Barreaux and
Georges Sarrazin
By William C. Linton
Attorney.

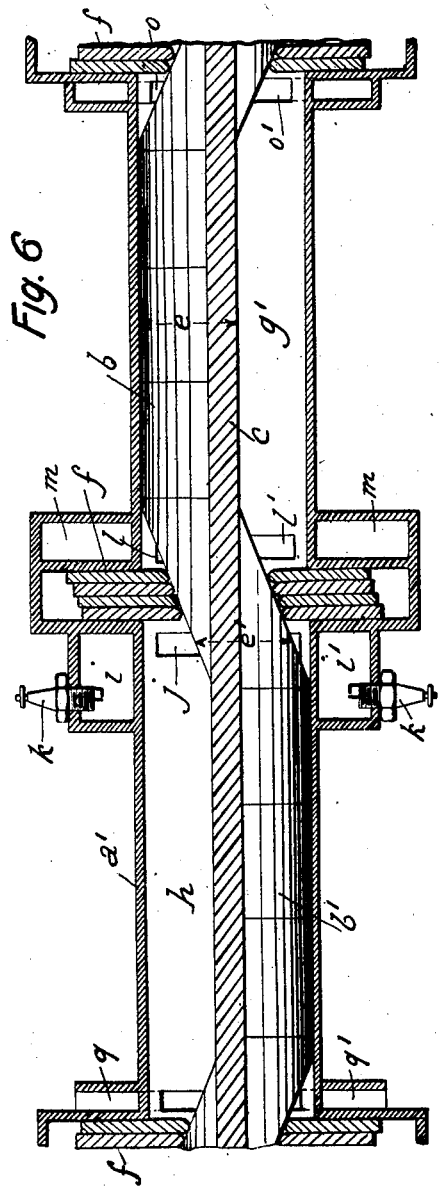
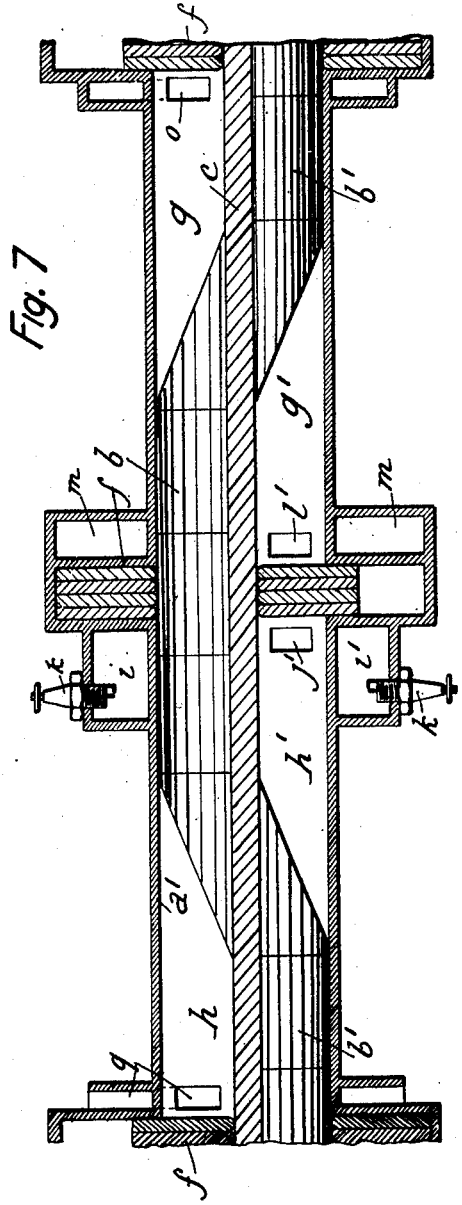

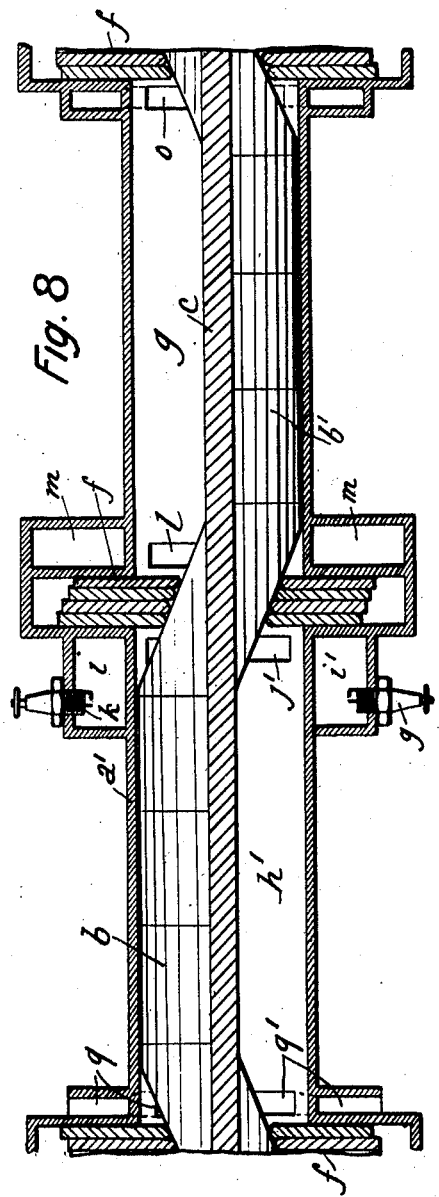
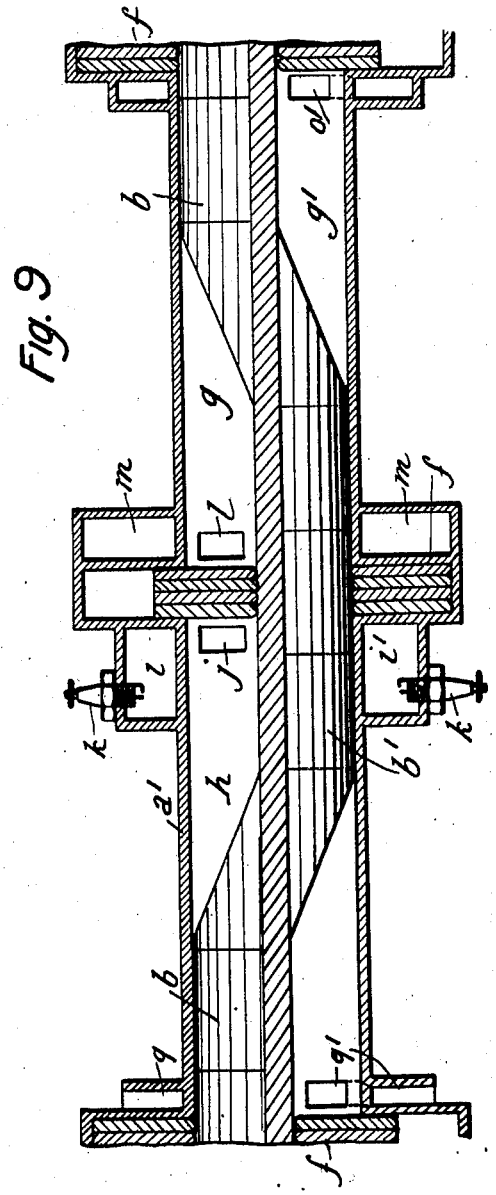
INVENTORS
Alphonse Barreaux and
Georges Sarrazin
By William C. Linton
Attorney.

Patented Sept. 29, 1931

1,825,571

UNITED STATES PATENT OFFICE

ALPHONSE BARREAUX, OF LOURY, AND GEORGES SARRAZIN, OF ORLEANS, FRANCE

ROTARY INTERNAL COMBUSTION ENGINE

Application filed January 23, 1930, Serial No. 422,875, and in France February 8, 1929.

Our invention has for its object a torus-shaped internal combustion engine. Its main feature lies in the fact that its rotary part is constituted by a plate to either side of which are secured two diametrically opposed pistons. These pistons are connected with the plate through sloping end surfaces whereby the total thickness of the plate and adjacent piston of the plate and adjacent piston end surfaces has a constant value. Said assembly may snugly fit inside a tranversal series of small blades which separates the torus-shaped chamber into two parts, said blades controlling moreover the distribution.

We have described hereinbelow by way of example and shown on accompanying drawings a form of execution of our invention.

Fig. 1 is a cross-section of the engine through the axis of rotation.

Fig. 2 is a view of the inside of the torus-shaped chamber supposed cut through its middle, after removal of the plate and pistons connected therewith (in this figure the connections are shown in a purely diagrammatical manner).

Fig. 3 is a cross-section through line 3–3 of Figs. 1 and 2 of part of the engine.

Fig. 4 is a cross-sectional view of two adjacent blades, the section being made through line 4—4 of Fig. 3.

Fig. 5 is a developed section of part of the explosion chamber.

Figs. 6 to 9 show a developed section of the chamber for different periods of the cycle of operation.

Referring to the drawings, $a$ designates the casing the torical inner space $a'$ of which serves for operation. In said chamber are fitted two diametrically opposed pistons $b$ and $b'$. These pistons are secured to opposite sides of a circular plate $c$ which divides the torus-shaped chamber into two symmetrical parts, said plate being rigidly secured to the driving shaft $d$ coaxial therewith.

The two pistons $b$ and $b'$ appear as opposed half-circular segments. They cover half the periphery of the torus-shaped chamber on the corresponding side of the plate $c$. Each piston is connected with the plate surface through a part sloping at an angle of about 25° whereby, the sloping connecting parts being reversely disposed in front of each other and on either side of the plate, we may provide a total thickness $e$ through these parts and supporting plate which is equal to the thickness $e$ through the piston body and supporting plate.

The casing $a$, is cut open through its middle so as to form the two slide ways $f'$ for the superposed blades $f$. These blades pass through the corresponding part of the space $a'$ and divide thus the half torus on the corresponding side of the plate into two compartments $g$ $h$ on one hand and $g'$—$h'$ on the other, the said compartments $g$ $h$ or $g'$ $h'$ following one another along the periphery of the corresponding half-torus. The compartments $g$—$g'$ serve at corresponding moments for admission and compression of the gaseous mixture respectively and the compartments $h$ $h'$ for their expansion and exhaust respectively. The superposed blades $f$ $f$ are adapted to slide in their slideways $f'$—$f'$ and fit on either side of the plate and piston $b$ or $b'$ secured thereto the thickness of which added to that of the plate is the abovementioned thickness $e$, as apparent from inspection of Fig. 3. Thus the blades are caused to reciprocate transversally under the action of the rotation of the shaft $d$ and of the plate $c$ which latter draws the pistons $b$—$b'$ along whereby the blades are alternatively moved in one direction and the other.

On either side of the torus-shaped chamber $a'$ and against the slideways $f, f'$ are disposed explosion chambers $i$—$i'$ each provided with a spark plug $k$. Each of these explosion chambers communicates on one hand through the aperture $j$ or $j'$ with the corresponding compartments $h$ or $h'$ disposed on the same side of the blades $f$ and on the other with the compartment $g'$ or $g$ disposed on the opposite side of the blades $f$ and of the plate $c$. This latter connection is established in the case of the compartment $g$ (refer more particularly to Fig. 5) through the duct 1 connecting the compartment $g$ to the chamber $m$, disposed on the side of the slideways $f'$ opposed to the explosion chambers, the port $n'$ provided on the wall of this chamber on the opposite side of the partition plate $c$, the port $r'$ provided in the superposed blades $f$ and the corresponding port $y'$, passing through the wall of the explosion chamber $i'$; during the period of the cycle of operations, during which this connection is established, the aperture $l'$ connecting the compartment $g'$ with the chamber $m$ is closed by the piston $b'$ and the explosion chamber $i$ is cut off from the compartments $g$ and $g'$ by the blades $f$.

As for the compartment $g'$, its connection with the explosion chamber $i$ is established through the duct $l'$ which connects the said compartment $g'$ with the chamber $m$, the port $n$ provided in the wall of this chamber on the other side of the partition plate $c$ with reference to the compartment $g'$, the port $r$ provided in the superposed blades $f$ and the corresponding port $y$ passing through the wall of the explosion chamber $i$. When the just disclosed connections are established, the port $l$ connecting the compartment $g$ with the chamber $m$ is closed by the piston $b$ and the explosion chamber $i'$ is cut off from both compartments $g$ and $g'$ by the blades $f$ covering the ports $y'$ and $n'$.

Assuming that the pistons shown on Figs. 5 to 9 move leftwards, the compartments $g$ $g'$ to the right of the blades $f$ communicate through the apertures $o$, $o'$ with the carburetter $p$. On the other hand the compartments $h$ $h'$ to the left of the blades $f$ communicate, at their ends removed from the explosion chambers, with the atmosphere through the exhaust ports $q$—$q'$.

The working is as follows for each piston: the piston $b$ for instance, being in the position shown in Fig. 6 and supposed to be moving leftwards, the carburetted gases passing out of the carburetter $p$ through the aperture $o$ which is uncovered at this moment are sucked into the compartment $g$ the volume of which increases. During this period of admission, the port $l$ (Fig. 7) is covered by the said piston $b$. When the piston $b$ moves beyond the blades $f$, it covers through one end the admission port $o$ and uncovers at its other end of the port $l$ (Fig. 8): the carburetted gases are now compressed in this same compartment $g$, the volume of which diminishes at this period and in the explosion chamber $i'$ on the other side of the plate $c$ communicating with the said compartment $g$ as explained hereinabove.

After the explosion has taken place, the gases expand in the compartment $h'$ and propel the piston $b'$ forwards. Said piston $b'$ forces the burnt gases formed by the precedent explosion and present in front of it through the exhaust aperture $q'$ (Fig. 9). The succession of phenomena is the same on both sides of the partition plate and the Figs. 6 to 9 illustrate the succession of the periods of the cycle of operation.

Fig. 6: the suction begins in the compartment $g$ to the rear of the piston $b$ which forces into the atmosphere the burnt gases produced by the precedent explosion which fill the compartment $h$ in front of the said piston $b$. On the other hand the suction is at an end in the compartment $g'$ and after explosion, the gases compressed into the chamber $i'$ by the piston $b$ expand and propel the piston $b'$.

Fig. 7: the fresh gases are admitted to the rear of the piston $b$ and the burnt gases are forced out by the front of said piston. On the other hand the gases precedently sucked in by the piston $b'$ are compressed into the explosion chamber $i$ whereas the rear of said piston $b'$ is urged forwards by the driving action of the gases expanding in the compartment $h'$.

Fig. 8: the suction is at an end in the compartment $g$ and, the explosion taking place in the chamber $i$, the gases previously compressed therein expand and urge the piston $b$ forwards. On the other hand the suction begins in the compartment $g'$ to the rear of the piston $b'$ which begins forcing into the atmosphere the burnt gases from the compartment $h'$.

Fig. 9: the gases previously sucked in by the piston $b$ are compressed to the left thereof into the explosion chamber $i'$ and the rear of the said piston $b$ is submitted to the driving action of the gases expanding in the compartment $h$. On the other hand, the fresh gases are admitted to the rear of the piston $b'$ and the burnt gases are forced out by the front of the piston.

As apparent from the above described cycle of operation, there are two successive explosions for each revolution of the engine. If the casing were divided into four parts instead of into two and with the provision of four explosion chambers instead of two, we may obtain two simultaneous explosions on either side of the plate which would ensure a more perfect equilibrium.

The ignition of the charge is provided by a magneto $s$ keyed to the engine shaft to which is also keyed the fly-wheel $t$.

The blades $f$ which divide the casing in two engage on one hand the slideways $f'$ and on the other the recesses $f^2$ in the core of the cylinder so as to ensure a perfect fluidtightness. In the part of the blades passing over the partition plate $c$ and the piston is provided a recess $u$. The superposed recesses $u$ of two adjacent blades serve to receive a spring $v$ bearing against the end of the recess in one blade and the opposite end of the recess in the other blade, the recesses overlapping slightly in the longitudinal direction. Consequently the spring $v$ urges the two coöperating blades $f$ towards one another, whereby said blades are brought to bear against one of the sides of the plate c with a view to ensure a perfect fluidtightness.

The fluidtightness at the inner and outer periphery of the torus-shaped casing is ensured by means of ring-shaped packing blades x. The fluidtightness of the pistons is ensured by means of very long packing rings the surface of which is flush with that of the casing, said rings being urged towards the inner wall of said casing by a plurality of small springs fitted inside said rings.

What we claim is:

1. An internal combustion engine comprising a torus-shaped casing having an intake chamber therein, a partition disposed in the equatorial plane of the casing, a driven shaft coaxial with the torus and secured to the partition, pistons secured to either side of the partition and adapted to cooperate with the inner casing wall, a double blade arrangement disposed in a diametrical plane of the casing and adapted to allow the fluidtight passage of the partition and pistons through it, means for feeding an aeriform explosive to the intake chamber of the casing on either side of the partition, means for igniting said mixture, means for leading the gases from one side of the blade arrangement to a point of the casing on the other side thereof and means for exhausting the burnt gases.

2. An internal combustion engine comprising an annular casing having an intake chamber therein, a rotary shaft coaxil therewith, a plate perpendicular to said shaft, rigidly secured thereto and passing through said casing, pistons carried by both sides of the plate for cooperation with the inner walls of the casing and the shape of which is such that the total thickness of the plate and pistons carried thereby is constant throughout any circular line concentric with the shaft described on the plate, a double blade arrangement adapted to slide in fluidtight contact with the plate and pistons in a diametrical plane of the casing, means for feeding an aeriform explosive mixture to the intake chamber of the casing on both sides of the plate, means for igniting said mixture, means for leading the gases from one side of the blade arrangement to the other on the outside of the casing and means for exhausting the burnt gases.

3. An internal combustion engine comprising an annular casing having an intake chamber therein, a rotary shaft coaxial therewith, a plate perpendicular to said shaft, rigidly secured thereto and passing through said casing, an even number of pistons carried in spaced relationship on one side of the plate for cooperation with the corresponding part of the inner wall of the casing, and provided with sloping extensions, an equal number of pistons carried in spaced relationship on the other side of the plate for cooperation with the corresponding part of the inner wall of the casing, in staggered relationship with reference to the first pistons and provided with sloping extensions, the arrangement being such that the total thickness of the plate and parts carried thereby is constant throughout any circular line concentric with the shaft described on the plate, a double blade arrangement fitting over the plate and parts borne thereby and adapted to slide in a diametrical plane of the casing, means for feeding an aeriform explosive mixture to the intake chamber of the casing on both sides of the plate, means for igniting said mixture, means for leading the gases from one side of the blade arrangement to the other on the outside of the casing and means for exhausting the burnt gases.

4. An internal combustion engine comprising an annular casing having an intake chamber therein, a rotary shaft coaxial therewith, a plate perpendicular to said shaft, rigidly secured thereto and passing through said casing, an even number of pistons carried in spaced relationship on one side of the plate for cooperation with the corresponding part of the inner wall of the casing, and provided with sloping extensions an equal number of pistons carried in spaced relationship on the other side of the plate for cooperation with the corresponding part of the inner wall of the casing, in staggered relationship with reference to the first pistons and provided with sloping extensions, the arrangement being such that the total thickness of the plate and parts carried thereby is constant throughout any circular line concentric with the shaft described on the plate, a double blade arrangement fitting over the plate and parts borne thereby and adapted to slide in a diametrical plane of the casing, means for feeding a carburetted mixture to the intake chamber of the casing on both sides of the plate and on the same side of the blade arrangement, explosion chambers into which is forced the mixture compressed by the pistons against the blade arrangement, means for igniting the mixture in the ignition chambers and means whereby the exploded gases are caused to reenter the casing on the other side of the blade arrangement for urging the pistons forward and means whereby the burnt gases are forced out of the casing by the pistons nearing the blade arrangement on the said other side of the said arrangement.

ALPHONSE BARREAUX.
GEORGES SARRAZIN.